United States Patent [19]

Niciri et al.

[11] Patent Number: 5,252,695

[45] Date of Patent: Oct. 12, 1993

[54] FAST SWITCHING FERROELECTRIC LIQUID CRYSTALLINE POLYMERS

[75] Inventors: Jawad Niciri, Falls Church; Joel M. Schnur, Burke; Ranganathan Shashidhar, Springfield, all of Va.

[73] Assignees: The United States of America as represented by the Secretary of the Navy, Washington, D.C.; Geo-Centers, Inc., Newton Centre, Mass.

[21] Appl. No.: 892,951

[22] Filed: Jun. 3, 1992

[51] Int. Cl.$^5$ .............................................. C08G 77/22
[52] U.S. Cl. .................................. 528/30; 525/330.6; 525/479; 526/318.4; 526/319; 526/326; 526/328; 526/328.5; 526/329.7; 528/41; 359/103; 252/299.01; 428/1
[58] Field of Search .............. 525/330.6, 479; 526/318.4, 318.41, 319, 326, 328.5, 329.7, 328; 528/30, 41; 359/103; 252/299.01; 428/1

[56] References Cited

U.S. PATENT DOCUMENTS

| | | | |
|---|---|---|---|
| 4,818,807 | 4/1989 | Morita et al. | 528/195 |
| 4,877,858 | 10/1989 | Hachiya et al. | 528/100 |
| 4,913,839 | 4/1990 | Uchida et al. | 526/320 |
| 5,190,687 | 3/1993 | Hachiya et al. | 526/326 |

OTHER PUBLICATIONS

Shibaev et al, *Polymer Bulletin,* vol. 12, pp. 299-301, (1984).
Shibaev et al, *Pure & Appl. Chem.* vol. 57, No. 11, pp. 1589-1602, (1985).
Decobert et al, *Polymer Bulletin,* vol. 14, pp. 179-186, (1985).
Guglielminetti et al, *Polymer Bulletin,* vol. 16, pp. 411-418, (1986).
Hahn et al, *Macromolecules,* vol. 20, No. 12, 0525pp. 2961-2968, (1987).
Keller, *Ferroelectrics,* vol. 85, pp. 425-434, (1988).
Zentel et al, *Liquid Crystals,* vol. 2, No. 1, pp. 83-89, (1987).
Bualek et al, *Makromol. Chem.,* vol. 189, pp. 797-804, (1988).
Kapitza et al, *Makromol. Chem.,* vol. 189, 1793-1807, (1988).

*Primary Examiner*—John Kight, III
*Assistant Examiner*—Rachel Johnson
*Attorney, Agent, or Firm*—Oblon, Spivak, McClelland, Maier & Neustadt

[57] ABSTRACT

Liquid crystal polymers containing 0.1 to 0.9 mole % of repeating units bearing a mesogenic side group and 0.1 to 0.9 mole % of repeating units which do not bear a mesogenic side group in which the mesogenic side group has the formula:

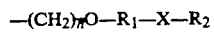

$R_1$ is 1,4-phenylene or 4,4'-biphenylene;
X is —COO— or —OCO—;
$R_2$ is

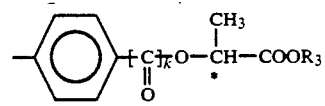

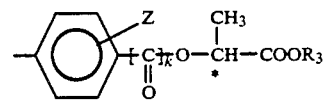

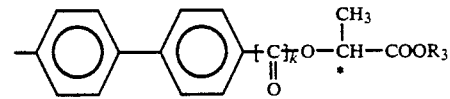

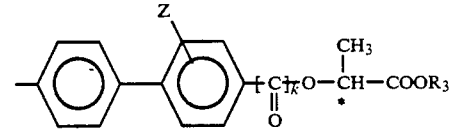

wherein k is 0 or 1,
* indicates an optically active center;
Z is $NO_2$, F, or Cl;
$R_3$ is $C_lH_{2l+1}$, —*$CH(CH_3)C_pH_{2p+1}$ —$CH_2C_qF_{2q+1}$, —*$CH(CH_3)COOC_tH_{2t+1}$ (wherein l and p are each independently an integer of from 1 to 10 and q and t are each independently an integer of from 1 to 6); and n is an integer of 4 to 12;
exhibit fast response times.

20 Claims, No Drawings

FAST SWITCHING FERROELECTRIC LIQUID CRYSTALLINE POLYMERS

BACKGROUND OF THE INVENTION

1. Field of the Invention

The present invention relates to novel ferroelectric side-chain liquid crystalline copolymers, with siloxane backbone and a triaromatic mesogen as the side group. In these copolymers, a certain proportion of the repetitive units of the polymer backbone bears the mesogenic side groups. The materials exhibit ferroelectric smectic C (or SmC*) mesophase over a large range of temperatures, in some cases extending to subambient temperature. They also possess high values of spontaneous polarization and exhibit fast electro-optic switching times. In addition, these materials show pronounced electroclinic effects in the smectic A phase. Such liquid crystalline compounds are useful in the field of electro-optic devices, pyro-electric and piezo-electric detectors, non-linear optics, etc.

2. Discussion of the Background

In the last decade, the area of applications of liquid crystal displays (LCDs) has grown from wrist-watches to computer terminals and television displays. Most of the current liquid crystal displays are based on effects shown by conventional low molecular weight nematic liquid crystals. However, these materials are limited in that their response speeds are low, i.e., on the order of several tens of milliseconds. To overcome this problem, Clark and Lagerwall described a structure in which the ferroelectric character of the chiral smectic phase (SmC*) is optimally employed: the so-called Surface Stabilized Ferroelectric Liquid Crystal (SSFLC) structure. These liquid crystals have bistable states under the application of an electric field, the states being switchable on reversing the polarity of the field. Since this switching is essentially related to molecular rotation about its long axis, the response speed is faster than in the case of a nematic liquid crystal.

Still, the application of these materials for the processing of large size and curved screens remains limited. This is because, in order to make these large screens, it is important to have a uniform and defined distance (~microns) between the two glass substrates in which the liquid crystalline compound is sandwiched. Practically, this is impossible to accomplish over large areas.

In order to solve this problem, it has been tried to use polymeric liquid crystals so as to make the materials easily processable (molding, film making, etc.). There have been some reports of the observation of the SmC* phase in side-chain liquid crystal polymers.

For example, Shibaev et al, *Polymer Bull.*, vol. 12, p. 299 (1984) have reported a side chain liquid crystal polymer, and the exact formula:

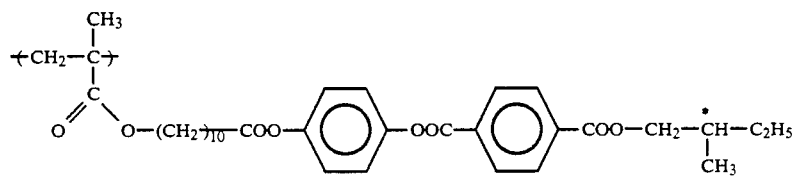

was reported later by Shivaev et al, *Pure and Applied Chem.*, vol. 57, p. 1589 (1985).

Decobert et al, *Polym. Bull.*, vol. 14, p. 179 (1985) have reported a number of polymers having the structure $AX_n$:

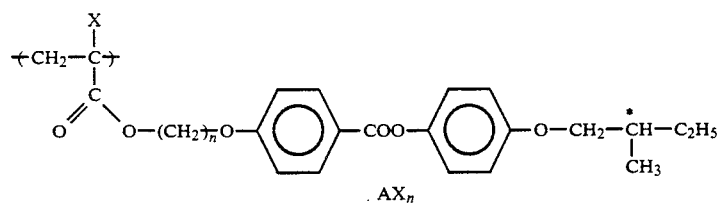

$X=H, CH_3, Cl$
$n=2, 6, 11.$

Guglielminetti et al, *Polym. Bull.*, vol. 16, p. 411 (1986) have reported compounds of the formula $BX_n$

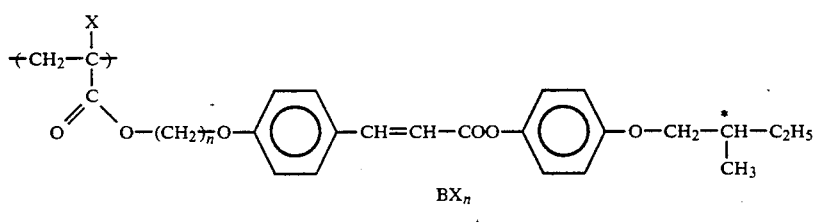

$X=H, CH_3, Cl$
$n=2, 6, 11$

Shibaev et al, *Vissokomol Soedin*, vol. 29, p. 1470 (1987) have also reported a side chain liquid crystal polymer of the formula:

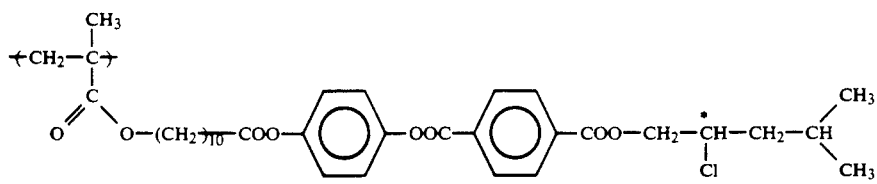

Hahn and Percec, *Macromolecules*, vol. 20, p. 2961 (1987) have reported a polysiloxane side chain liquid crystal polymer having the formula:

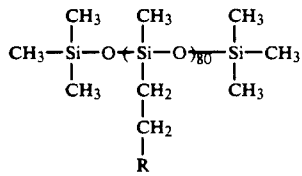

With R = -continued

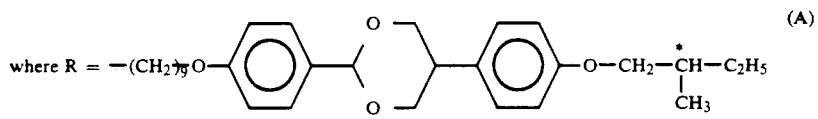   (A)

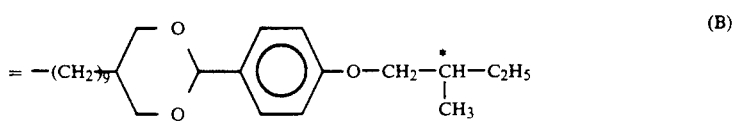   (B)

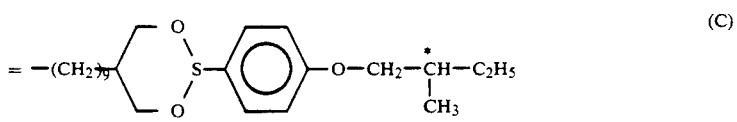   (C)

Keller, *Ferroelectrics*, vol. 85, p. 813, (1988) has described another polysiloxane liquid crystal polymer of the formula

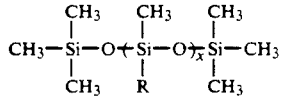

Zentel et al, *Liquid Crystals*, vol. 2, p. 83, (1987) have prepared combined liquid crystal polymers of the formula

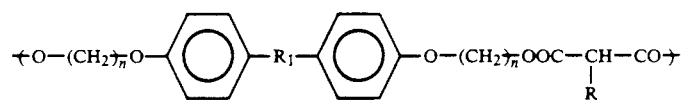

with

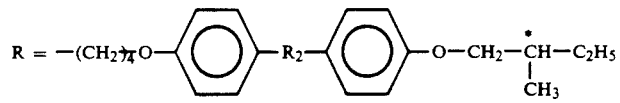

n = 2 or 6

Bualek et al, *Makromol. Chem.*, vol. 189, p. 797 (1988) have also prepared combined liquid crystal polymers which have the formula:

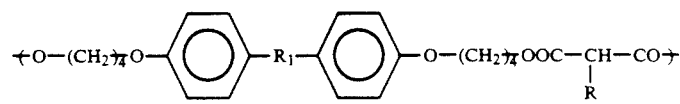

with

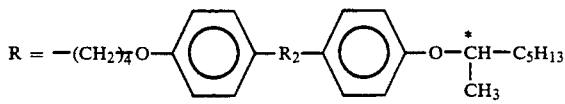

Kapitza et al, *Makromol. Chem.*, vol. 189, p. 1793 (1988) have reported combined liquid crystal polymers of the formula:

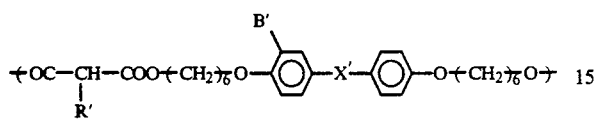

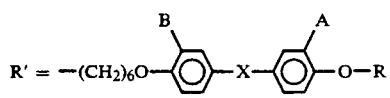

with:
A, B, B' = Br, H

X, X' = none, —N=N—, —N=N— 
                            O

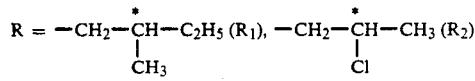

However, these materials exhibit the SmC* phase only at high temperatures. Also, the materials reported so far have switching times of the order of a few milliseconds and hence are not suitable for the above-described applications. Thus, there remains is a need for faster switching polymers with ferroelectric phase over a large temperature range extending to room temperature. The present invention reports novel materials which satisfy these requirements.

SUMMARY OF THE INVENTION

Accordingly, it is an object of the present invention to provide novel fast switching liquid crystalline polymers.

It is another object of the present invention to provide liquid crystal displays which contain such liquid crystalline polymers.

These and other objects, which will become apparent during the following detailed description, have been achieved by the inventors' discovery that copolymers which contain (a) 0.1 to 0.9 mole % of repeating units bearing at least one side-chain mesogenic group and (b) 0.1 to 0.9 mole % of repeating units which do not bear a side-chain mesogenic group and wherein the side-chain mesogenic group has the formula:

—(CH$_2$)$_n$O—R$_1$—X—R$_2$ wherein R$_1$ is 1,4-phenylene or 4,4'-biphenylene; X is —COO— or —OCO—; R$_2$ is

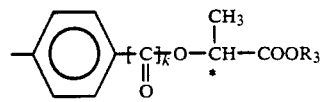

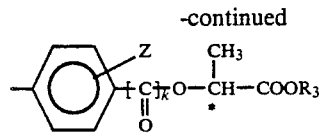

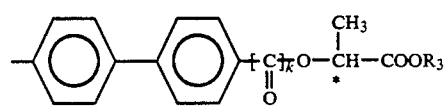

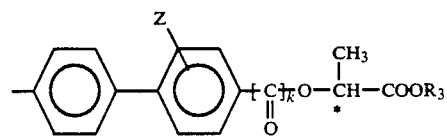

in which k is 0 or 1, * denotes an optically active center; Z is NO$_2$, F, or Cl; R$_3$ is C$_l$H$_{2l+1}$, —*CH(CH$_3$)C$_p$H$_{2p+1}$ —CH$_2$C$_q$F$_{2q+1}$, or —*CH(CH$_3$)COOC$_t$H$_{2t+1}$ (l and p are each independently an integer of from 1 to 10 and q and t are each independently an integer of from 1 to 6); and n is an integer of 4 to 12; are ferroelectric liquid crystalline copolymers which not only exhibit a wide chiral smectic phase range within room temperature, but also exhibit high response speeds to external fields.

DETAILED DESCRIPTION OF THE PREFERRED EMBODIMENTS

As noted above, the object of the present invention is to solve the above-mentioned problems and to provide new ferroelectric liquid crystalline copolymers which not only have a wide chiral smectic phase range within room temperature, but also exhibit high response speeds to external fields.

Thus, the present invention provides side-chain liquid crystal polymers which contain (a) 0.1 to 0.9 mole % of repeating units which bear at least one of a particular mesogenic side group and (b) 0.1 to 0.9 mole % of repeating units which do not bear a mesogenic side group in which the mesogenic side group has the formula —(CH$_2$)$_n$O—R$_1$—X—R$_2$ in which n, R$_1$, X, and R$_2$ are as described above. Suitably, the backbone of polymer may be any type of conventional polymer, such as a poly-α,β-unsaturated acid or ester, polysiloxane, polyalkene, polyether, polyester, polysulfone or polychloroacrylate. In a preferred embodiment, the liquid crystalline copolymers provided by the present invention contain a poly(alk)acrylate or a polysiloxane backbone and bear a certain ratio of mesogenic side groups. These liquid crystalline copolymers are represented by the following general formulae:

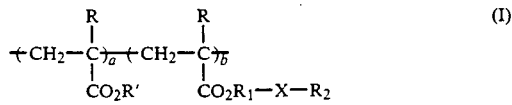  (I)

-continued

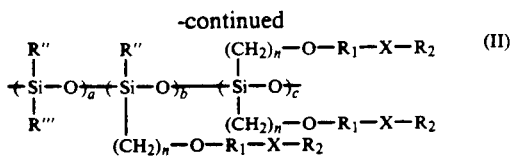

(II)

wherein: the ratio b/(a+b) is any fraction between 0.1 and 0.9 for the copolymers of formula (I);
the ratio (b+c)/(a+b+c) is any fraction between 0.1 and 0.9 for the copolymers of formula (II);
R is H or $C_{1-4}$-alkyl;
R' is H or $C_{1-4}$-alkyl;
R" is $C_{1-4}$-alkyl;
R"' is $C_{1-4}$-alkyl;
$R_1$ is 1-4-phenylene or 4,4'-biphenylene;
X is —COO— or —OCO—;
$R_2$ is

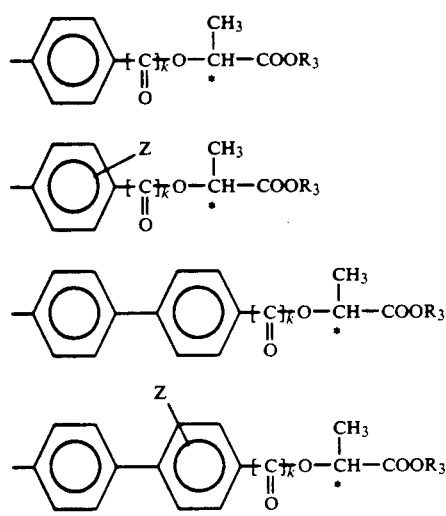

wherein
k is 0 or 1;
* is an optically active center;
Z is $NO_2$, F, Cl;
$R_3$ is $C_lH_{2l+1}$, —$C^*H(CH_3)C_pH_{2p+1}$, —$CH_2C_qF_{2q+1}$, —$C^*H(CH_3)COOC_tH_{2t+1}$ (wherein l and p are each independently an integer from 1 to 10 and q and t are each independently an integer from 1 to 6); and n is an integer of from 4 to 12.

The liquid crystal polymers of the present invention are preferably random copolymers with the units a and b distributed randomly throughout the copolymer. The copolymers of formula (II) are particularly preferred. Especially preferred are those compounds of formula (II) in which the ratio c/(a+b+c) is 0.

The copolymers of formula (I) may be prepared by copolymerizing the monomers corresponding to the repeating units a and b by the reaction shown below:

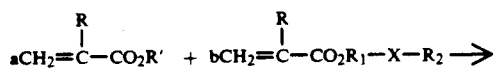

Such polymerization reactions may be carried out in accordance with any conventional method for polymerizing α,β-unsaturated carboxylic acids. Such polymerizations may be carried out, e.g., by heating a mixture of the monomers in an inert solvent in the presence of a polymerization catalyst such as azobis(isobutyronitrile) or ultraviolet light. In such polymerizations, the ratio of a:b in the final polymer will correspond to the relative amounts of the monomers in the reaction mixture.

Alternatively, the copolymers of formula (I) may be prepared by esterifying an already existing poly(alk)acrylate polymer as shown below:

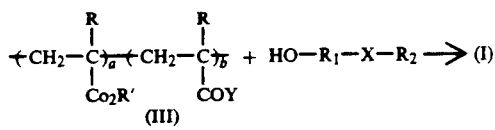

wherein R, R', $R_1$, X, and $R_2$ are as defined above and Y is —OH or Cl.

The copolymers of formula (III) in which Y is —OH are commercially available or may be prepared by copolymerizing monomers as shown below:

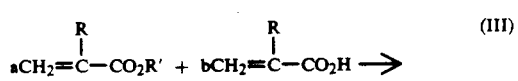

The copolymers of formula (III) in which Y is Cl may be prepared by treating the corresponding copolymer having Y=—OH with a chlorinating agent such as thionyl chloride in an inert solvent such as an alkane (hexane or heptanes) or an aromatic solvent (benzene or toluene).

In the case of formula (I), it is preferred that R is either H or methyl, and the number average molecular weight is suitably between 4,000 and 80,000.

The liquid crystalline copolymers of the formula (II) described in this invention may prepared by reaction of a mesogenic vinyl end group derivative with a preformed copolysiloxane backbone, e.g., poly(dimethylsiloxane-co-methylhydrogenosiloxane) in presence of Platinum catalyst, via a hydrosilylation reaction.

The starting polysiloxane backbone can be prepared or may be purchased. Different kinds of statistical poly(dialkylsiloxane-co-alkylhydrosiloxane), poly(dialkylsiloxane-co-dihydroxiloxane), and poly(dialkylsiloxane-co-alkylhydrosiloxane-co-dihydrosiloxane) copolymers are commercially available or easily synthesized, varying in the molecular weight, the polydispersity index and the proportion of methylhydrogenosiloxane units and/or dihydrosiloxane units.

The number average molecular weight of the resulting liquid crystalline copolymers of formula (II) is preferably between 4,000 and 80,000 depending upon the molecular weight and the proportion of the methylhydrogenosiloxane units of the starting copolysiloxane, the nature and the purity of the mesogenic derivative, the nature of the catalyst, etc.

The synthetic method for the preparation of the liquid crystalline copolymers of the present invention is described below.

For example, the synthesis scheme of the copolysiloxane of formula (II) with
n=10; $R_1$ is 4,4'-biphenylene; 0=c/(a+b+c);
X is —COO—;
$R_2$ is

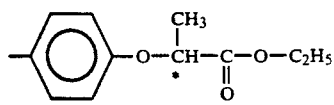

$R_3$ is —$C_2H_5$
may be outlined schematically as follows:

For the preparation of copolymers of formula (II) in which repeating units (c) having two mesogenic groups are present, the above-described synthesis is changed by starting with a polysiloxane copolymer containing repeating units of the formula ($SiH_2$—O).

An alternative for the preparation of these materials, namely a base catalyzed polymerization technique, may be considered. However, this method is less efficient than the above-described hydrosilylation reaction be-

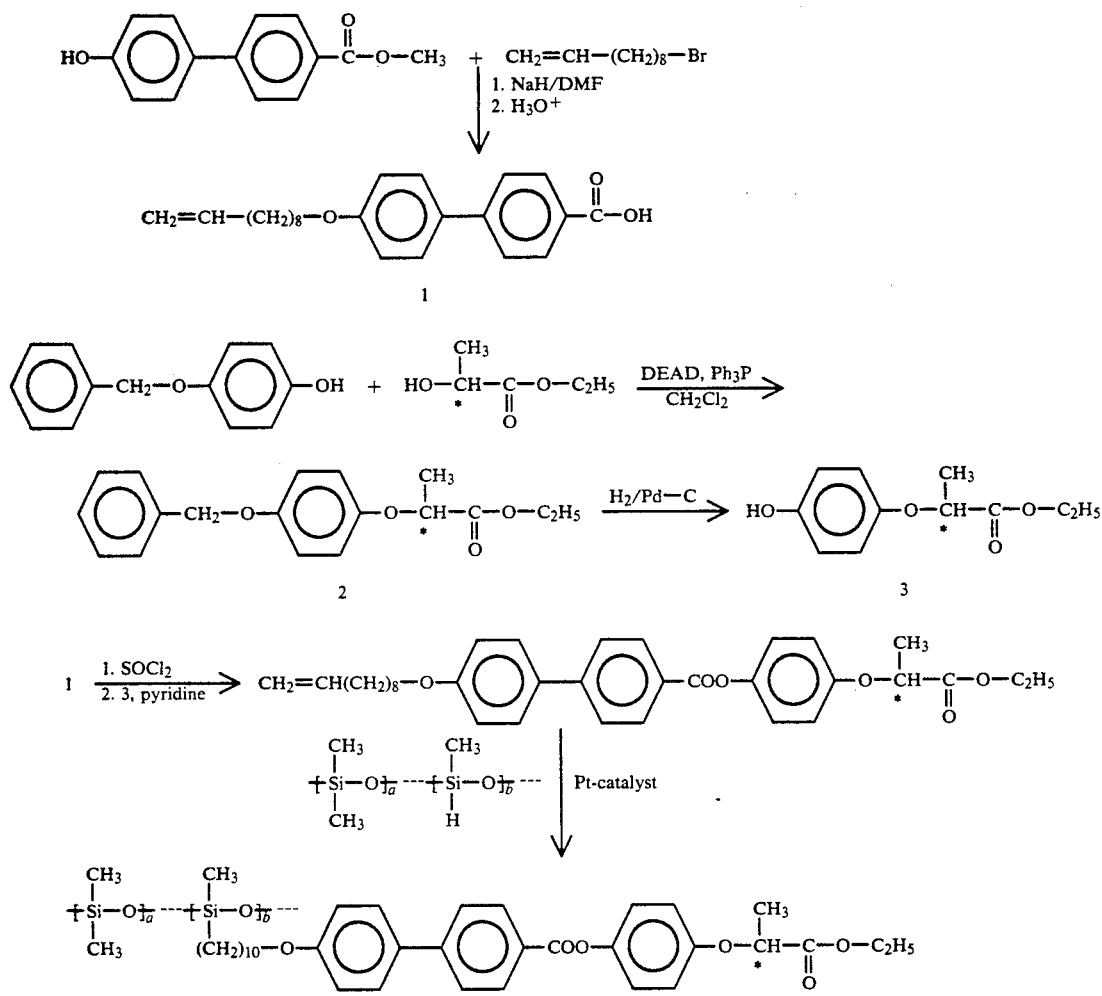

$\overline{DP_n} = 30$
$b/(a + b) = 0.3$

The mesogenic group (R)-4'-(1-ethoxycarbonyl-1-ethoxy)-phenyl-4-[4-(9-decenyloxy)-phenyl]-benzoate 1 was synthesized as follows. 4'-(9-decenyloxy)biphenyl-4 carboxylic acid 1 was prepared by reacting hydroxybiphenyl carboxylic acid methyl ester with 10-bromo-1-decene in DMF containing NaH followed by hydrolysis. Compound 2 was synthesized by coupling of ethyl-(S)-2 hydroxypropionate with p-(benzyloxy)phenol. Hydrogenolysis of 2 by Palladium on activated charcoal led to the formation of the phenol derivative 3. The final product 1 was obtained by reaction of the acid chloride of 1 with 3 in the presence of pyridine.

The corresponding copolymer was obtained through the hydrosilylation reaction between the olefinic derivative and the poly(dimethylsiloxane-co-methylhydrogenosiloxane).

cause it leads to the formation of side products which are difficult to eliminate, and shows less reproducibility related to the preparation of these materials (e.g., molecular weight, polydispersity, fixation ratio in mesogenic side groups).

The present side chain liquid crystal polymers are useful in a number of applications, including liquid crystal display devices, transducers, pyroelectric detectors, and non-linear optics. The use of side chain liquid crystal polymers in such devices is well known in the art. For example, electrooptic light modulator devices containing side chain liquid crystal polymers are described in U.S. Pat. Nos. 4,944,896 and 4,948,532, which are incorporated herein by reference. Similarly, a display device may be prepared by disposing an amount of the present liquid crystal polymer between two electrodes. The present side chain liquid crystal polymers may also be used in erasable and reconfigurable memory devices.

It should be understood that a key feature of the present side chain liquid crystal polymers is the fact that by selecting the proper value of the ratio b/(a+b) for the copolymers of formula (I) or (b+c)/(a+b+c) for the copolymers of formula (II) it is possible to control the viscosity and, thus the switching time of the side chain liquid crystal polymers. Thus, the present invention provides tunable liquid crystal polymers.

In some applications, it may be desirable to add an amount of a low molecular weight chiral compound which is miscible with the side chain liquid crystal polymer. Such mixtures are described in U.S. Pat. No. 4,293,435, which is incorporated herein by reference.

Other features of the invention will become apparent in the course of the following descriptions of exemplary embodiments which are given for illustration of the invention and are not intended to be limiting thereof.

EXAMPLES

In the following examples, the structures of the copolymers were determined by $^1$H NMR, IR and elemental analysis.

The phases exhibited by the materials have been identified by optical microscopy and the phase transition temperatures were detected both by optical microscopy and by differential scanning calorimetry. The electrooptic switching times were determined with a photo diode measuring the transmitted light of the sample placed between polarizers. The switching time is defined as the time required for an intensity change from 0% to 90% on applying a square wave. The spontaneous polarization has been measured by the triangular wave method. A 20 V amplitude triangular wave (frequency range 0.1 Hz to 100 Hz) was applied across 4 μm thick and the current was determined by measuring the voltage drop across a reference resistance with a storage oscilloscope.

The phase states are represented by the following abbreviations: (Cry, crystal; Iso, isotropic; SmA, smectic A phase; SmC*, chiral smectic C phase; SmX, unidentified high ordered smectic phase; and g, glassy state.

EXAMPLE 1

Preparation of the liquid crystalline copolymer represented by the formula:

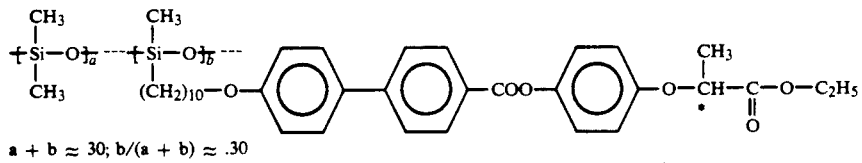

a + b ≈ 30; b/(a + b) ≈ .30

1.1 Synthesis of 4'-(9-decenyloxy)biphenyl-4-carboxylic acid

To a nitrogen flushed flask, kept at 0° C., containing 960 mg (40 mmol) of oil-free sodium hydride was added 150 ml of dry DMF. A solution of 6.57 g (30 mmol) of 10-bromo-1-decene in 20 ml of DMF was added dropwise to the suspension. The resulting mixture was allowed to stir for 1 h at room temperature, and 8 h at 80° C. The solvent was removed by rotary evaporation in vacuo, and excess sodium hydride was quenched by addition of water. A 1N HCl solution was poured into the mixture, and the resulting precipitate was filtered and washed with 10% aqueous sodium bicarbonate solution and water. The crude product was recrystallized twice from ethanol to afford 8.7 g (79%) of 4'-(9-decenyloxy)biphenyl-4-carboxylic acid methyl ester. Hydrolysis of the ester derivative in the presence of KOH/ethanol led to the acid derivative which was recrystallized from acetic acid to yield 90% of the product.

1.2 1-(Benzyloxy)-4-[(R)-1-carboethoxy-ethoxy]benzene

To 4.48 g (38 mmol) of ethyl (S)-2-hydroxypropanoate, 10 g (50 mmol) of p-(benzyloxy)phenol, and 13.1 g (50 mmol) of triphenylphosphine was added 200 ml of dichloromethane. To this mixture was added dropwise a solution of 20 ml of dichloromethane and 8.2 ml (50 mmol) of diethyl azodicarboxylate. The reaction mixture was stirred overnight at room temperature. After evaporation of the solvent, the residue was subjected to column chromatography on silica gel to yield 7 g (61%) of pure product (mp 52° C.).

1.3 p-[(R)-1-ethoxycarbonyl-1-ethoxy]phenol

Hydrogen was allowed to bubble through a stirred suspension of 10% palladium on carbon (0.4 g) in 40 ml of dichloromethane. After 15 min, 7 g (23 mmol) of benzyl ether 2 was added, and the reaction mixture was stirred overnight. The suspension was filtered through a celite pad, the solvent was removed by rotary evaporation, and the crude product was obtained by distillation under vacuum to yield 4.5 g (91%) of the product.

1.4 (R)-4'-(1-carboethoxy-ethyoxy)phenyl 4-[4-(9-decenyloxy)phenyl]benzoate

A mixture of 1 (2.11 g, 6 mmol), thionyl chloride (20 ml) and two drops of DMF was refluxed for 3 h at 80° C., and then the remaining thionyl chloride was removed under vacuum. Into the mixture of the acid chloride and the phenol derivative 3 (1.3) g, 6.2 mmol) were added 1 ml of pyridine and a few crystals of 4-(dimethylamino)pyridine (DMAP) in dichloromethane (30 ml) under an atmosphere of nitrogen. After three days of stirring at room temperature, the reaction mixture was quenched with 10% HCl aqueous, washed with 5% sodium hydroxide solution and brine, and then dried over MgSO$_4$. The removal of the solvent gave a thick oil which was purified by column chromatography on silica gel. The product was further purified by two recrystallizations from ethanol to yield 1.8 g (55%) of the expected material.

1.5 Synthesis of the ferroelectric liquid crystalline copolymer

To a solution of poly[(65-70%)dimethylsiloxane-co-(30-35%)methylhydrogenosiloxane] (0.73 mmol of Si-H function) dissolved in 50 ml of dry toluene was added 500 mg (0.92 mmol) of the vinyl derivative described above. The reaction mixture was heated to 100° C. under nitrogen and 20 μl of dicyclopentadienyl-platinum (II) chloride catalyst solution was then injected (1 mg/ml in dichloromethane). The mixture was refluxed under nitrogen for about two days. The resulting liquid crystalline copolymer was purified by gel permeation chromatography, and was isolated by precipitation from tetrahydrofuran solution into methanol. The copolymer was dried under vacuum at 60° C. (yield: 57%).

The liquid crystalline copolymer exhibits the following phase transition temperatures:
g 15° C. SmC* 136° C. SmA 155° C. Iso
The electro-optical properties of the copolymer are:
Response time: 0.15 msec at 129° C.
Spontaneous polarization: 180 nC/cm$^2$ at 35° C.

EXAMPLE 2

Preparation of the liquid crystalline copolymer having the following formula:

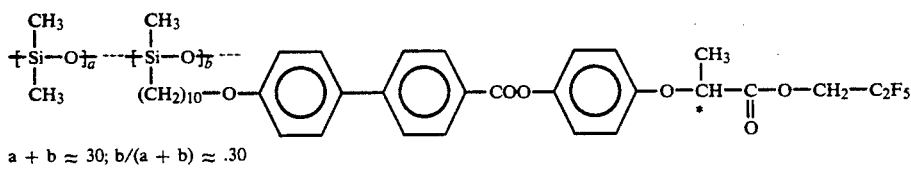

a + b ≈ 30; b/(a + b) ≈ .30

2.1 (R)-2-(benzyloxy)phenoxypropanoic acid

To a solution of benzyl ether 2 (6 g, 20 mmol) prepared in example 1, in 150 ml of methanol and 40 ml of water, were added 3.75 g (90 mmol) of LiOH; H$_2$O. The reaction mixture was stirred overnight at room temperature. After evaporation of the solvent, the residue was neutralized by HCl in water. The suspension was filtered, and the crude product was recrystallized from an ethanol/water mixture. Yield 5 g (91%); mp 96.6°–97.6° C.

2.2  2,2,3,3,3-pentafluoropropyl  (R)-2-(4-benzyloxy)-phenoxypropanoate

To a suspension of (R)-2-(benzyloxy)phenoxypropanoic acid (3.5 g, 13 mmol) and 60 ml of benzene, were added 2.8 ml (32 mmol) of oxalyl chloride and two drops of pyridine. After stirring the reaction mixture overnight at room temperature, the solvent was removed in vacuo. The acid chloride was dissolved in toluene and added dropwise to a solution of 2,2,3,3,3-pentafluoro-1-propanol (2.1 g, 14 mmol), 10 ml of pyridine, few crystals of 4-dimethylaminopyridine (DMAP) in 80 ml of toluene. The mixture was heated for 1 h at 80° C. and left overnight at room temperature. The solvent was removed, and the residue was dissolved in dichloromethane, washed with water, HCl solution, sodium bicarbonate, and dried with Na$_2$SO$_4$. Evaporation of the solvent led to the final compound: 3.5 g (66%) of a clear liquid.

2.3 p-[(R)-1-ethoxycarbonyl-1-(2,2,3,3,3-pentafluoro-1-propanoxy)]phenol

This compound was prepared by the same procedure used in Example 1.3. The final product (white crystals, 90% yield) was used for the next step without further purification. Mp 81°–82° C.

2.4 (R)-4-(1-carbo-(2,2,3,3,3-pentafluoropropoxy)ethoxylphenyl 4-(9-decenyloxy-4'-phenyl)benzoate To a mixture of the phenol derivative (1.9 g, 5.93 mmol) prepared above, compound 1 (2.09 g, 5.93 mmol) of Example 1, and DMAP (61 mg, 0.49 mmol) in 100 ml of dichloromethane, was added 1-(3-dimethylaminopropyl)-3-ethyl-carbodiimidemethiodide (2.43 g, 8.2 mmol). The mixture was stirred for 24 h at room temperature. After dilution with dichloromethane, the organic phase was washed with water, a saturated solution of sodium bicarbonate, brine and finally dried over sodium sulfate. The solvent was evaporated and the residue was purified by column chromatography on silica gel. The product was further purified by recrystallization from ethanol to yield 2.44 g (61%) of white crystals.

2.5 Synthesis of the ferroelectric liquid crystalline copolymer

The synthesis of the copolymer was performed by the same procedure used in the preparation of the copolymer in Example 1 and using the same starting copolysiloxane. The final product was dried under vacuum at 60° C. (yield: 65%).

The liquid crystalline copolymer exhibits the following transition temperatures:
g 30° C. SmX 52° C. SmC* 139° C. SmA 170° C. Iso
The electro-optical properties of the copolymer are:
Response time: 0.13 msec at 135° C.
Spontaneous polarization: 330 nC/Cm$^2$ at 55° C.

EXAMPLE 3

Preparation of the liquid crystalline copolymer represented by the formula:

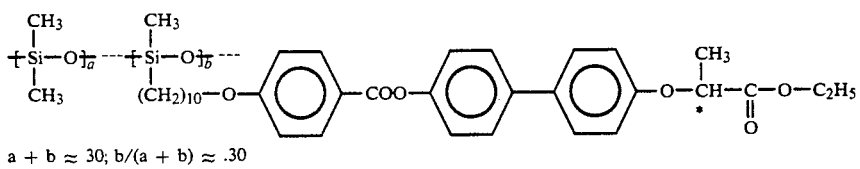

a + b ≈ 30; b/(a + b) ≈ .30

3.1 Ethyl (R)-2-(4-hydroxyphenyl)-4'-phenoypropanoate

To 4 g (21 mmol) of p,p'-biphenol, 2.36 g (20 mmol) of ethyl (S)-2-hydroxypropanoate, and 5.5 g (21 mmol) of triphenylphosphine in 100 ml of THF, was added dropwise a solution of diethyl azodicarboxylate 3.6I ml (23 mmol) in 20 ml of THF. The reaction mixture was stirred overnight at room temperature. After evaporation of the solvent, the residue was purified by column chromatography on silica gel to yield 2.9 g (51%) of the expected product.

3.2  (R)-4-[4'-(1-carbo(ethoxy)ethoxyphenyl]phenyl-4-(9-decenyloxy)benzoate

The preparation of this material was performed following the procedure used to make compound 4 in Example 2. The final product was purified by column chromatography on silica gel. The material was further purified by recrystallization from hexane to give a yield of 58%.

3.3 Synthesis of the ferroelectric liquid crystalline polymer

The synthesis of the ferroelectric liquid crystalline copolymer was performed by the same procedure used in the preparation of the copolymer in Example 1. The final product was dried under vacuum at 70° C.: yield 70%.

The liquid crystalline copolymer exhibits the following transition temperatures:
Cryst 57° C. SmC* 118° C. Iso
The electro-optical properties of the copolymer are:
Response time: 0.31 msec at 117° C.
Spontaneous polarization: 161 nC/cm² at 40° C.

EXAMPLE 4

Preparation of the liquid crystalline copolymer represented by the formula:

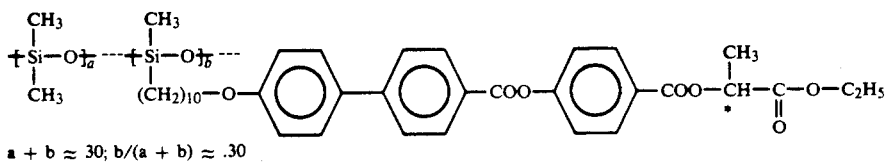

a + b ≈ 30; b/(a + b) ≈ .30

4.1 [{(S)-1-carboethyl-ethoxy]-4-benzyloxy benzoate 2.96 g (13 mmol) of p-benzyloxybenzoic acid, 2.3 ml (26 mmol) of oxalyl chloride and 50 cm³ of dry benzene were mixed and stirred overnight at room temperature. The solvent was then removed by distillation and the residue was solubilized in 30 cm³ of dry pyridine. To this solution, 1.55 g (13 mmol) of the ethyl-(S)-2-hydroxypropanoate in 20 cm³ of dry pyridine were added and stirred overnight at room temperature. The resulting mixture was extracted with ether and the organic layers were washed with sulfuric acid, water, sodium hydrogen carbonate solution and finally with water. After drying the ether solution over anhydrous magnesium sulfate, the solvent was removed by evaporation and the residue was purified by column chromatography on silica gel to give 4.0 g of pure product (yield: 95%).

4.2 p-(S)-1-ethylcarbonyl-1-ethoxy]phenol

This compound was prepared using the same procedure as in Example 1.3. The product was further purified by column chromatography on silica gel to give 2.3 g of a clear oil (yield: 95%).

4.3 Ferroelectric liquid crystalline copolymer

The synthesis of the copolymer was performed by the same procedure used in the preparation of the copolymer in Example 1 and using the same starting copolysiloxane. The final product was dried for 2 days under vacuum at 60° C. (yield: 75%).

The copolymer exhibits the following phase transition temperature:
g 6° C. Cry 10° C. SmC. 163.5° C. SmA 191° C. Iso
Spontaneous polarization: 140 nC/cm² at 40° C.

The present invention provides novel ferroelectric liquid crystalline copolymers. These materials exhibit wide range of temperature of ferroelectric smectic C phase, large polarization and fast electro-optical switching times. The liquid crystalline copolymers may be used as a film which can be produced by known film forming techniques such as casting or stretching techniques. Such a film can find applications in various fields of optoelectronics, i.e., large displays or curved display screens, electronic optical shutters, memory devices, etc. Furthermore, the liquid crystalline copolymers may be further improved by blending these materials with a specific low molecular weight liquid crystalline compound; or by mixing them with additives such as some organic compounds or metals.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal polymer, having the formula (I) or (II):

(I)

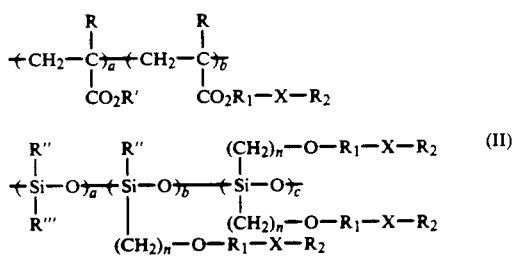

wherein the ratio b/(a+b) is any fraction between 0.1 and 0.9 for the polymer of formula (I);

the ratio (b+c)/(a+b+c) is between 0.1 and 0.9 for the polymer of formula (II);

R is H or $C_{1-4}$-alkyl; R' is H or $C_{1-4}$-alkyl; R'' is $C_{1-4}$-alkyl; and R''' is $C_{1-4}$-alkyl;

$R_1$ is 1,4-phenylene or 4,4'-biphenylene;

X is —COO— or —OCO—;

$R_2$ is

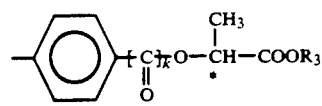

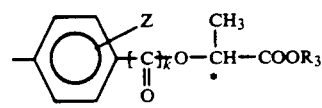

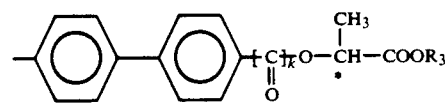

or

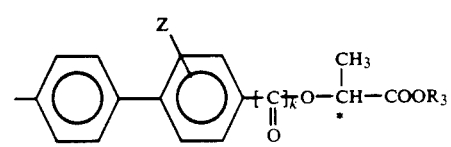

wherein k is 0 or 1,
* indicates an optically active center;
Z is $NO_2$, F, or Cl;
$R_3$ is $C_lH_{2l+1}$, —*$CH(CH_3)C_pH_{2p+1}$, —$CH_2C_qF_{2q+1}$, or —*$CH(CH_3)COOC_tH_{2t+1}$ (wherein l and p are each independently an integer of from 1 to 10 and q and t are each independently an integer of from 1 to 6); and n is an integer of 4 to 12.

2. The liquid crystal polymer of claim 1, which has the formula (I):

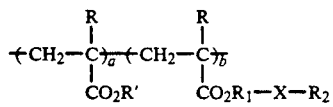
(I)

wherein the ratio b/(a+b) is any fraction between 0.1 and 0.9;
R is H or $C_{1-4}$-alkyl; R' is H or $C_{1-4}$-alkyl;
$R_1$ is 1,4-phenylene or 4,4'-biphenylene;
X is —COO— or —OCO—;
$R_2$ is

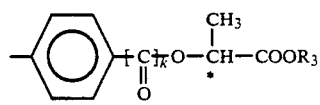

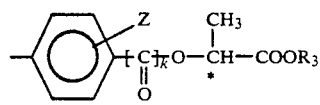

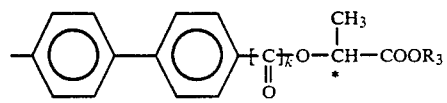

or

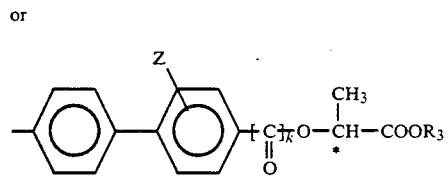

wherein k is 0 or 1,
* indicates an optically active center;
Z is $NO_2$, F, or Cl; and
$R_3$ is $C_lH_{2l+1}$, —*$CH(CH_3)C_pH_{2p+1}$, —$CH_2C_qF_{2q+1}$, or —*$CH(CH_3)COOC_tH_{2t+1}$ (wherein l and p are each independently an integer of from 1 to 10 and q and t are each independently an integer of from 1 to 6).

3. The liquid crystal polymer of claim 2, having a number average molecular weight between 4,000 and 80,000.

4. The liquid crystal polymer of claim 1, which has the formula (II):

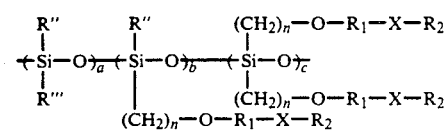
(II)

wherein the ratio (b+c)/(a+b+c) is between 0.1 and 0.9;
R'' is $C_{1-4}$-alkyl; and R''' is $C_{1-4}$-alkyl;
$R_1$ is 1,4-phenylene or 4,4'-biphenylene;
X is —COO— or —OCO—;
$R_2$ is

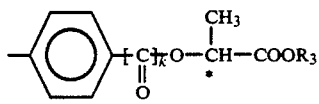

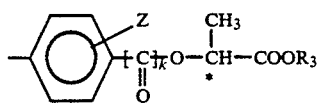

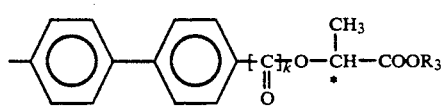

or

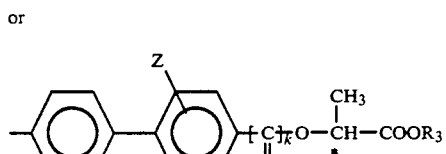

wherein k is 0 or 1,
* indicates an optically active center;
Z is $NO_2$, F, or Cl;
$R_3$ is $C_lH_{2l+1}$, —*$CH(CH_3)C_pH_{2p+1}$, —$CH_2C_qF_{2q+1}$, or —*$CH(CH_3)COOC_tH_{2t+1}$ (wherein l and p are each independently an integer of from 1 to 10 and q and t are each independently an integer of from 1 to 6); and n is an integer of 4 to 12.

5. The liquid crystal polymer of claim 4, having a number average molecular weight between 4,000 and 80,000.

6. The liquid crystal polymer of claim 4, wherein the ratio c/(a+b+c) is 0.

7. A display device, comprising two electrodes and a liquid crystal polymer disposed between said two electrodes, said liquid crystal polymer having the formula (I) or (II):

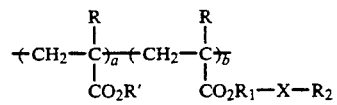
(I)

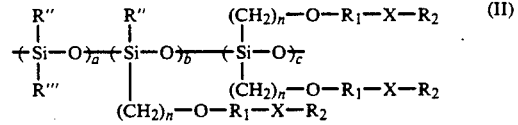
(II)

wherein the ratio b/(a+b) is any fraction between 0.1 and 0.9 for the polymer of formula (I);
the ratio (b+c)/(a+b+c) is between 0.1 and 0.9 for the polymer of formula (II);
R is H or $C_{1-4}$-alkyl; R' is H or $C_{1-4}$-alkyl; R'' is $C_{1-4}$-alkyl; and
R''' is $C_{1-4}$-alkyl;
$R_1$ is 1,4-phenylene or 4,4'-biphenylene;

X is —COO— or —OCO—;
R₂ is

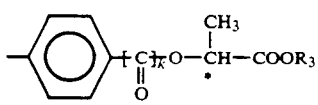

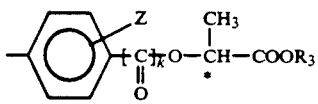

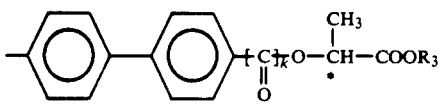

or

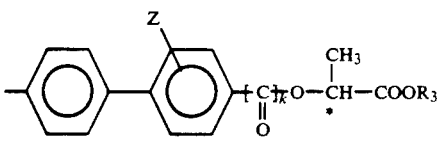

wherein k is 0 or 1,
* indicates an optically active center;
Z is NO₂, F, or Cl;
R₃ is $C_lH_{2l+1}$, —*CH(CH₃)$C_pH_{2p+1}$, —CH₂$C_qF_{2q+1}$, or —*CH(CH₃)COO$C_tH_{2t+1}$ (wherein l and p are each independently an integer of from 1 to 10 and q and t are each independently an integer of from 1 to 6); and n is an integer of 4 to 12.

8. The display device of claim 7, wherein said liquid crystal polymer has formula (I):

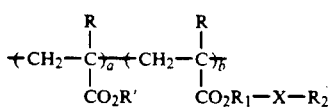  (I)

wherein the ratio b/(a+b) is any fraction between 0.1 and 0.9;
R is H or C₁₋₄-alkyl; R' is H or C₁₋₄-alkyl;
R₁ is 1,4-phenylene or 4,4'-biphenylene;
X is —COO— or —OCO—;
R₂ is

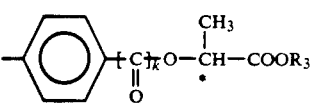

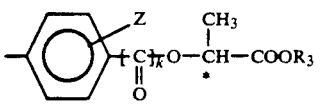

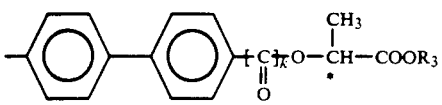

or

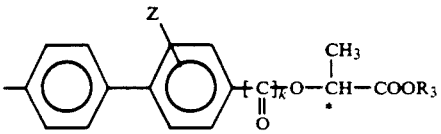

wherein k is 0 or 1,
* indicates an optically active center;
Z is NO₂, F, or Cl; and
R₃ is $C_lH_{2l+1}$, —*CH(CH₃)$C_pH_{2p+1}$, —CH₂$C_qF_{2q+1}$, or —*CH(CH₃)COO$C_tH_{2t+1}$ (wherein l and p are each independently an integer of from 1 to 10 and q and t are each independently an integer of from 1 to 6).

9. The display device of claim 7, wherein said liquid crystal polymer has formula (II):

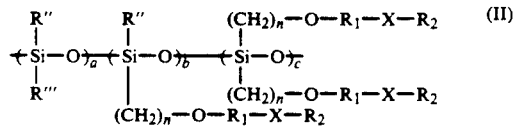  (II)

wherein the ratio (b+c)/(a+b+c) is between 0.1 and 0.9;
R'' is C₁₋₄-alkyl; and R''' is C₁₋₄-alkyl;
R₂ is

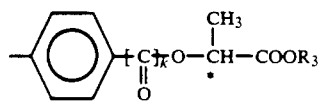

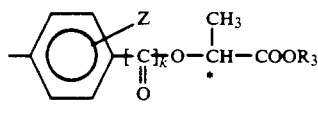

or

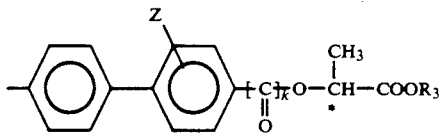

wherein k is 0 or 1,
* indicates an optically active center;
Z is NO₂, F, or Cl; and
R₃ is $C_lH_{2l+1}$, —*CH(CH₃)$C_pH_{2p+1}$, —CH₂$C_qF_{2q+1}$, or —*CH(CH₃)COO$C_tH_{2t+1}$ (wherein l and p are each independently an integer of from 1 to 10 and q and t are each independently an integer of from 1 to 6); and
n is an integer of 4 to 12.

10. In a device, comprising a liquid crystal polymer, the improvement being said liquid crystal polymer having the formula (I) or (II):

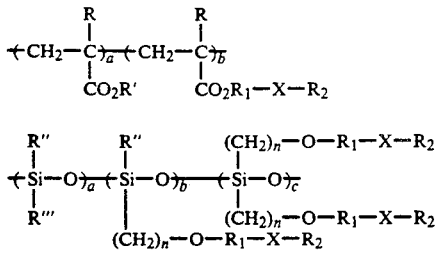

(I)

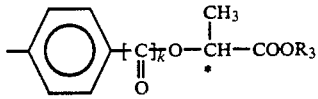

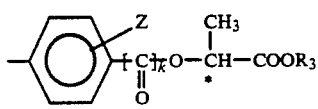

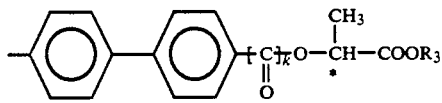

(II)

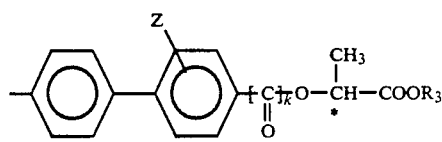

wherein the ratio b/(a+b) is any fraction between 0.1 and 0.9 for the polymer of formula (I);
the ratio (b+c)/(a+b+c) is between 0.1 and 0.9 for the polymer of formula (II);
R is H or $C_{1-4}$-alkyl; R' is H or $C_{1-4}$-alkyl; R" is $C_{1-4}$-alkyl; and
R''' is $C_{1-4}$-alkyl;
$R_1$ is 1,4-phenylene or 4,4'-biphenylene;
X is —COO— or —OCO—;
$R_2$ is

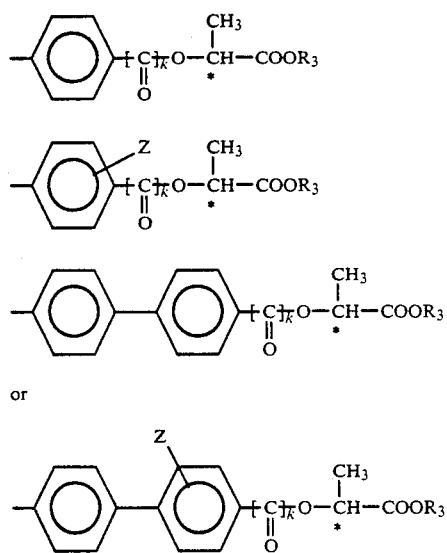

wherein k is 0 or 1,
* indicates an optically active center;
Z is $NO_2$, F, or Cl;
$R_3$ is $C_lH_{2l+1}$, —*CH(CH_3)C_pH_{2p+1}, —CH_2C_qF_{2q+1}, or —*CH(CH_3)COOC_tH_{2t+1} (wherein l and p are each independently an integer of from 1 to 10 and q and t are each independently an integer of from 1 to 6); and
n is an integer of 4 to 12.

11. The device of claim 10, wherein said liquid crystal polymer has the formula (I)

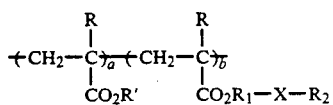

wherein the ratio b/(a+b) is any fraction between 0.1 and 0.9;
R is H or $C_{1-4}$-alkyl; R' is H or $C_{1-4}$-alkyl;
$R_1$ is 1,4-phenylene or 4,4'-biphenylene;
X is —COO— or —OCO—;
$R_2$ is

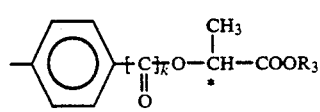

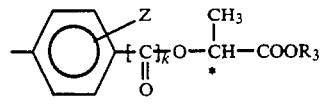

(subsequent structures)

wherein k is 0 or 1,
* indicates an optically active center;
Z is $NO_2$, F, or Cl; and
$R_3$ is $C_lH_{2l+1}$, —*CH(CH_3)C_pH_{2p+1}, —CH_2C_qF_{2q+1}, or —*CH(CH_3)COOC_tH_{2t+1} (wherein l and p are each independently an integer of from 1 to 10 and q and t are each independently an integer of from 1 to 6).

12. The device of claim 11, which is a transducer.
13. The device of claim 11, which is a display device.
14. The device of claim 11, which is a pyroelectric detector.
15. The device of claim 11, which is a non-linear optic device.
16. The device of claim 10, wherein said liquid crystal polymer has formula (II):

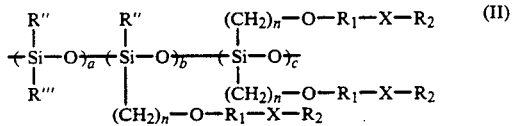

wherein the ratio (b+c)/(a+b+c) is between 0.1 and 0.9;
R" is $C_{1-4}$-alkyl; and R''' is $C_{1-4}$-alkyl;
$R_1$ is 1,4-phenylene or 4,4'-biphenylene;
X is —COO— or —OCO—;
$R_2$ is -continued

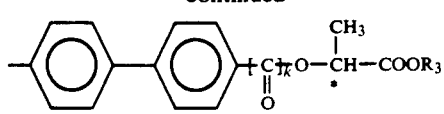

or

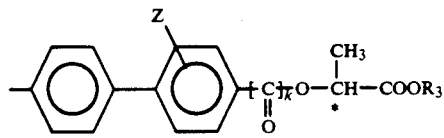

wherein k is 0 or 1,

* indicates an optically active center;
Z is $NO_2$, F, or Cl;
$R_3$ is $C_lH_{2l+1}$, $-*CH(CH_3)C_pH_{2p+1}$, $-CH_2C_qF_{2q+1}$, or $-*CH(CH_3)COOC_tH_{2t+1}$ (wherein l and p are each independently an integer of from 1 to 10 and q and t are each independently an integer of from 1 to 6); and
n is an integer of 4 to 12.

17. The device of claim 16, which is a transducer.
18. The device of claim 16, which is a display device.
19. The device of claim 16, which is a pyroelectric detector.
20. The device of claim 16, which is a non-linear optic device.

* * * * *

UNITED STATES PATENT AND TRADEMARK OFFICE
CERTIFICATE OF CORRECTION

PATENT NO. : 5,252,695
DATED : October 12, 1993
INVENTOR(S) : Niciri, et al.

It is certified that error appears in the above-identified patent and that said Letters Patent is hereby corrected as shown below:

On the front page of the patent, the first inventor's name reading Niciri; Jawad should read Naciri; Jawad.

Signed and Sealed this

Eighth Day of May, 2001

*Attest:*

NICHOLAS P. GODICI

*Attesting Officer*   *Acting Director of the United States Patent and Trademark Office*